(12) United States Patent
Phillips

(10) Patent No.: US 6,316,858 B1
(45) Date of Patent: Nov. 13, 2001

(54) MOTOR

(75) Inventor: Neil W. Phillips, Bristol (GB)

(73) Assignee: Notetry Limited (GB)

( * ) Notice: Subject to any disclaimer, the term of this patent is extended or adjusted under 35 U.S.C. 154(b) by 0 days.

(21) Appl. No.: 09/423,084

(22) PCT Filed: May 6, 1998

(86) PCT No.: PCT/GB98/01304

§ 371 Date: Feb. 7, 2000

§ 102(e) Date: Feb. 7, 2000

(87) PCT Pub. No.: WO98/50998

PCT Pub. Date: Nov. 12, 1998

(30) Foreign Application Priority Data

May 6, 1997 (GB) .................................. 9709179

(51) Int. Cl.⁷ .............................. H02K 29/00; H02K 7/20
(52) U.S. Cl. .............................. 310/114; 15/412; 15/377; 310/112
(58) Field of Search ..................... 310/112, 114, 310/166, 168, 49 A, 49 R, 266; 15/377, 383, 389, 412

(56) References Cited

U.S. PATENT DOCUMENTS

| 3,456,141 | * | 7/1969 | Burgess | 310/114 |
| 3,749,949 | | 7/1973 | Muller | 310/59 |
| 3,863,084 | * | 1/1975 | Hasebe | 310/114 |
| 4,164,852 | | 8/1979 | Anzalone | 62/429 |
| 4,225,999 | | 10/1980 | Martinec et al. | 15/422.2 |
| 4,563,604 | | 1/1986 | Xuan | 310/49 R |
| 4,745,754 | | 5/1988 | Kawamura | 60/608 |
| 4,829,205 | | 5/1989 | Lindgren | 310/166 |
| 5,124,606 | | 6/1992 | Eisenbeis | 310/114 |
| 5,701,633 | * | 12/1997 | Jonischus | 15/387 |

FOREIGN PATENT DOCUMENTS

| 26 06 807 | | 9/1977 | (DE) . |
| 33 13 768 A1 | | 10/1984 | (DE) . |
| 34 44 420 A1 | | 6/1986 | (DE) . |
| 02007923 | | 1/1990 | (EP) . |
| 0 715 397 A2 | | 6/1996 | (EP) . |
| 0 601 818 B1 | | 9/1996 | (EP) . |
| 0 746 084 A1 | | 12/1996 | (EP) . |
| 1198526 | | 8/1967 | (GB) . |
| 1 293 185 | | 10/1972 | (GB) . |
| 2 086 777 A | | 5/1982 | (GB) . |
| 2 125 229 a | | 2/1984 | (GB) . |
| 2 227 127 A | | 7/1990 | (GB) . |
| 2 255 859 A | | 11/1992 | (GB) . |
| 63159847 | * | 1/1990 | (JP) . |
| WO 80/01524 | | 7/1980 | (WO) . |

OTHER PUBLICATIONS

International Search Report dated Aug. 25, 1998.
British Search Report dated Apr. 12, 1997.

* cited by examiner

Primary Examiner—Nestor Ramirez
Assistant Examiner—Judson H. Jones
(74) Attorney, Agent, or Firm—Morrison & Foerster LLP

(57) ABSTRACT

A motor comprising two or more rotors (20, 30) rotated by means of a common power supply (6), each rotor (20, 30) having a plurality of poles (22, 32) and being associated with a stator (16, 26) having a plurality of poles (18, 28), wherein the arrangement of rotor poles (22, 32) and stator poles (18, 28) is different for each rotor 920, 30) so that the rotors (20, 30) rotate at different speeds when the common power supply (6) is applied.

16 Claims, 7 Drawing Sheets

MOTOR

FIELD OF THE INVENTION

The invention relates to a motor.

BACKGROUND OF THE INVENTION

Many developments have been made over the years to motors, in particular to those motors which are used in domestic household appliances. However, it is generally believed that the trend of improvements in relation to universal motors is nearing its end. It is therefore an object of the present invention to provide a motor which is suitable for providing the appropriate power to various parts of a domestic household appliance and which also has scope for improvement beyond the potential of known universal motors.

Domestic household appliances such as vacuum cleaners very often include a universal motor adapted to drive the fan used to create the suction by means of which air is drawn into the vacuum cleaner. When the vacuum cleaner is an upright cleaner, a brush bar is usually mounted rotatably in the dirty air inlet located in the cleaner head. The brush bar is rotated by means of a drive belt extending between the motor and the brush bar. There are many disadvantages of this arrangement, not least of which is the vulnerability of the drive belt itself. Other disadvantages include the fact that, in most cases, the drive belt engages with a portion of the outer surface of the brush bar which means that brush bristles cannot be located in that area. It is also advantageous to have some sort of mechanism for preventing the brush bar from rotating against a carpet to be cleaned if, for any reason, the motor is left running whilst the vacuum cleaner remains stationary, for example, whilst carrying out above-floor cleaning.

In a cylinder cleaner, the dirty air inlet is situated at the end of a hose, hence a drive belt to the main vacuum motor is impractical, and driving the brush bar directly by a secondary universal motor has practical difficulties. Pneumatically powered "turbo" brushes have been proposed, but they are normally inefficient and reduce the power watts available for the pickup of dirt and dust by the cleaner head.

It is therefore an object of the invention to provide a motor suitable for use in a vacuum cleaner having a driven brush bar but which reduces or eliminates the problems identified above.

SUMMARY OF THE INVENTION

The invention is to a motor. In particular, the invention is to a motor having at least two rotors.

The provision of at least two rotors in the motor has been identified as an economical and compact way of driving two separate features of a household appliance such as a vacuum cleaner at different speeds. Making use of a common stator and the same winding or windings or a common power supply to drive two separate rotors is clearly advantageous in an environment in which consumers demand small, lightweight appliances.

BRIEF DESCRIPTION OF THE DRAWINGS

A number of alternative embodiments of the invention will now be described by way of example with reference to the accompanying drawings in which.

DETAILED DESCRIPTION OF THE INVENTION

Figure 1:
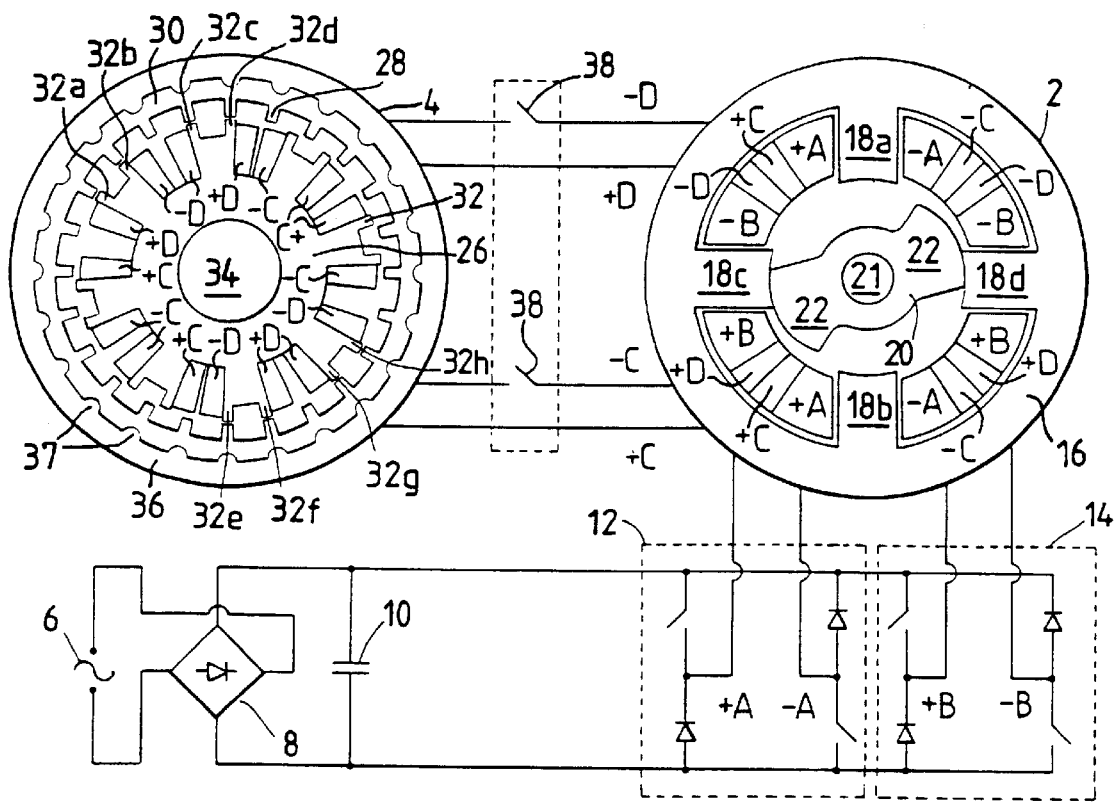
FIG. 1 is a schematic view of a primary and secondary motor arrangement.

FIG. 1 shows a primary 4/2 two-phase switched reluctance motor 2, a secondary 24/16 two-phase switched reluctance motor 4 and a power supply circuit which is connected to the primary motor 2. Other types of switched reluctance motor, (e.g. single phase, three phase, four phase, etc) could be used for either motor, if desired. The arrangement shown is perceived as being particularly suitable for driving the fan and brush bar of a vacuum cleaner, although this is by no means the only application envisaged.

In common with known switched reluctance motors, the primary motor 2 comprises a stator 16 with four salient poles 18a–18d. Opposed poles 18a and 18b each support a like armature winding +A,−A which form a first phase. Opposed poles 18c and 18d accommodate respective like armature windings +B,−B which represent a second phase. A rotor 20 is rotatably mounted upon an axis 21 within the stator 16 and comprises opposed poles 22. The rotor 20 is formed from steel laminated in the axial direction.

Power is supplied to the motor 2 from a mains supply 6 which is rectified by a bridge rectifier 8. A capacitor 10 is provided for smoothing the bridge output. Each of the armature winding pairings A,B is fed via a respective asymmetric half bridge 12,14. Each half bridge 12,14 relates to a respective one of the two phases. In this regard, half bridge 12 supplies the A windings and half bridge 14 supplies the B windings.

For continuous operation, current is applied to each of the stator phases in turn at a rate which is dependent on and determined by the variation of the rotor position with time. The timing of the asymmetric half bridges 12,14 is determined by reference to the rotor positions of the primary and/or secondary motors by means of either optical or Hall effect sensors or any other suitable means.

The primary reluctance motor 2 also includes two additional winding pairs: C and D. One winding of winding pair C is accommodated on each of salient poles 18a and 18b. One winding of the winding pair D is accommodated on each of the salient poles 18c and 18d.

The respective pairings of windings A and C on the one hand and B and D on the other each operate in the manner of a transformer. The current induced in winding pairs C and D by winding pairs A and B is supplied to the secondary reluctance motor 4. For convenience of assembly within the brush bar of the vacuum cleaner, this motor is structurally the inverse of the primary motor 2. That is to say, the rotor 30 is situated radially outside the stator 26, which is located upon a fixed axis 34. The radially inner surface of the brush bar 36 is fitted directly upon the radially outer surface of the rotor 30 and secured in place by splines 37.

Closer reference to FIG. 1 will reveal that the stator 26 comprises sixteen poles 32. The rotor 30 comprises twenty-four radially inwardly directed poles 28. The poles 32 situated upon the stator 26 are arranged in pairs, with each pair being surrounded by a respective winding. The windings themselves are paired circumferentially and then these pairs of windings are in turn paired with a similar pair of windings situated on the radially opposite side of the stator. For example, poles 32a and 32b are provided with a D winding. Circumferentially adjacent poles 32c and 32d are provided with a second D winding. Radially opposite, poles 32e–32h are arranged in a similar fashion. The spacing between the poles 32a–32h is such as to enable their simultaneous radial correspondence with rotor poles 28, as shown in the figure. However, the poles associated with the D windings are radially off-set from the coils associated with the C windings, such that radial correspondence with the rotor poles cannot be achieved by the poles associated with the C coils at the same time as the poles associated with the D coils. Hence a two-phase structure results.

The number of poles provided in the secondary switched reluctance motor 2 ensures smooth rotation of the brush bar 36.

The power supply to the primary reluctance motor 4 is typically switched at a frequency of the order of 1.25 kHz per phase, (if a 4/4 single phase switched reluctance motor were used as the primary a switching frequency of about 2.5 kHz would be comparable). The secondary reluctance motor can be switched at the same, high frequency (or reduced ratio by disconnecting the secondary windings from the number of poles). As a consequence of this magnitude of frequency, there is no need to provide for a high level of flux build-up in the coil armature of the primary motor (or an intermediate transformer, if the voltage is stepped down outside the primary motor). Because the voltage to the secondary motor 4 is stepped-down and isolated from the voltage of the primary motor 2, the supply of power to the secondary motor is very safe. In fact, the supply is so safe that the power can be fed via the hose to the suction head of a cylinder vacuum cleaner without a risk of compromising safety.

Supplying power to the primary motor 2 via the power supply circuit causes the primary rotor 22 to rotate within the stator 16. The current flowing within the coils A,B induces current in coils C,D which in turn causes the secondary rotor 30 to rotate about the secondary stator 36. The number of poles present on each stator 16,36 and rotor 22,30 determines the relative speeds of rotation; in this example, the secondary rotor 30 will rotate at one twelfth of the speed of the primary rotor 22.

Switches 38 are provided in order to enable the electrical connection to the windings C,D to be interrupted. The switches can be operated manually or triggered automatically in response to the conditions of the device in which the motor is situated. For example, it may be desirable to switch off the brush bar of a vacuum cleaner under some circumstances and operation of the switches 38 can achieve this. The switches can be made to open in the event that the handle of the vacuum cleaner is put into the upright position by means of simple electronic circuitry which will be readily available to a skilled reader. The switches can also be operated intermittently, for example during start-up of the brush bar, so that the rotation of the brush bar can be brought up to speed in a controlled and reliable manner.

By using a switched reluctance motor as the secondary motor 4, significant advantages arise. Due to the lack of commutating brushes, no carbon powder is generated by brush wear. Furthermore, the motor has a relatively long life and its speed is not limited by the need to maintain a reasonable brush life. Use of a switched reluctance motor as the primary motor enables a switched reluctance motor to be used as the secondary motor with relative ease.

Figure 2A:
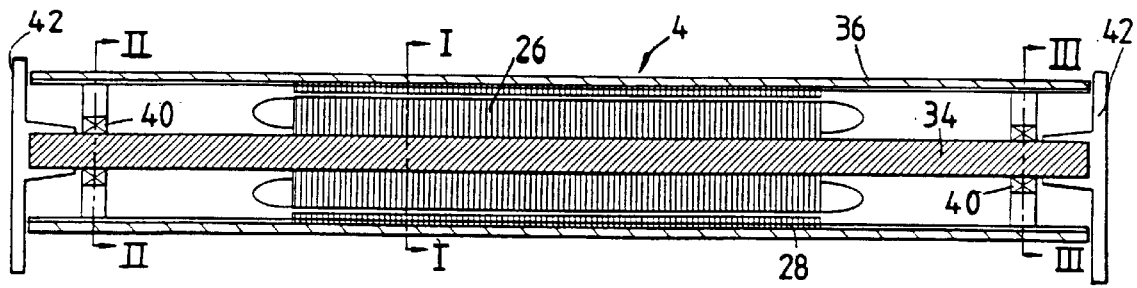
FIGS. 2a–2d are sectional and cross-sectional views of the brush bar incorporating the secondary motor of FIG. 1.
Figure 2B:
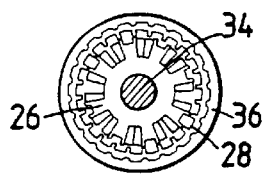
Figure 2C:
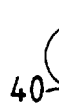
Figure 2D:

FIGS. 2a–2d show the secondary motor 2 of FIG. 1, situated within a vacuum cleaner brush bar 36, in more detail. FIG. 2a is a section. Views 2b–2d are cross-sections taken along lines I to III in FIG. 2a, respectively. Referring to FIG. 2a, it will be seen that the brush bar 36 and rotor 28 are together mounted by means of bearings 40 upon the shaft 34 that supports the stator 26. The shaft 34 is mounted at each end to a housing 42 of the vacuum cleaner. From cross sectional FIG. 2c, it will be seen that the shaft 34 includes four axial grooves 42 situated at circumferential intervals (eg 90°). Each groove 42 accommodates a wire for supplying current from the primary motor 2 to the secondary motor 4.

Figure 3A:
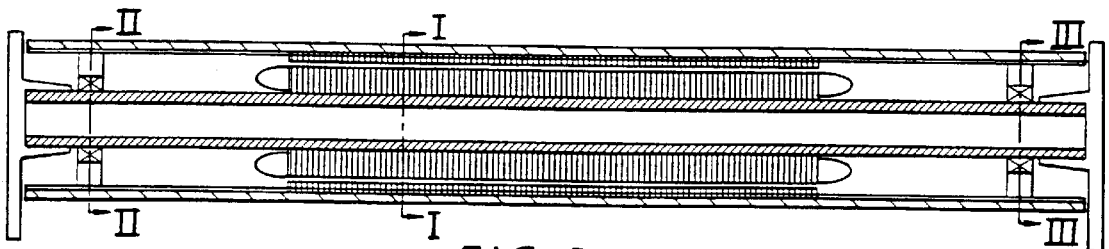
FIGS. 3a–3d are sectional and cross-sectional views of a second brush bar incorporating a secondary motor such as shown in FIG. 1.
Figure 3B:
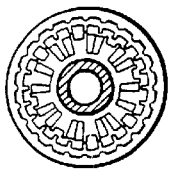
Figure 3C:
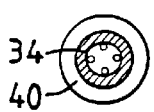
Figure 3D:
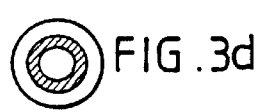

FIGS. 3a–3d show a variation of the arrangement of FIG. 2. FIG. 3a is a section and FIGS. 3b to 3d are cross-sections taken along lines I to III in FIG. 3a, respectively. In this set-up, the shaft 34 is hollow and the wires for supplying current to the windings of the secondary motor run inside the shaft, as can clearly be seen from cross sectional FIG. 3c.

Although the above arrangements have a greater number of poles in the secondary motor than in the primary motor, this is not necessary. The primary motor can have an equal or greater number of poles relative to the secondary motor if circumstances require it. For example on a washing machine, a primary motor used as a direct drive could operate at about 0–2000 rpm and drive a secondary motor for a high-speed water pump operating at 0–10,000 rpm. In such a case, it would be appropriate for the primary motor to have a greater number of poles than the secondary motor. In the case of the example mentioned, the primary motor will have a pole arrangement capable of driving the secondary motor at five times the speed of the primary motor.

FIG. 4 illustrates various embodiments of the invention, in each of which one or more windings are used to drive more than one rotor of a single motor. FIG. 4a illustrates an embodiment having similarities to the arrangements illustrated in FIGS. 1 to 3. The motor 500 has a stator 502 carrying a winding A and twenty four external poles 504. Rotatably mounted radially outwardly of the stator 502 is an external rotor 506, also carrying twenty four poles 508. A plurality of splines 510 are arranged between the external rotor 506 and the interior surface of a brush bar cylinder 512 of a vacuum cleaner. This arrangement can be used to cause rotation of the brush bar 512 in the same way as is described in relation to the earlier figures.

Figure 4A:
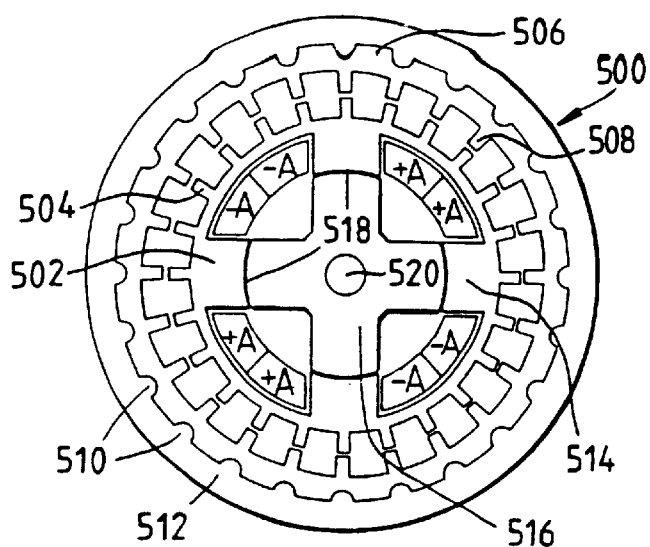
FIGS. 4a–4g are schematic cross-sectional views of various alternative motors in accordance with the present invention.

The main difference between the motor illustrated in FIG. 4a and the previously illustrated motors is the provision of four internal poles 514 on the stator 502. Radially inwardly of the stator 502 is mounted a second, inner rotor 516 having four equispaced poles 518. The inner rotor 516 is rotatably mounted about a central axle 520.

It will be appreciated that, simultaneously with the rotation of the external rotor 506 when power is supplied to the winding A, the inner rotor 516 will also rotate. However, the speed of rotation of the inner rotor 516 will be six times the speed of rotation of the external rotor 526 due to the difference in the number poles provided on each rotor and the associated stator.

Figure 4B:
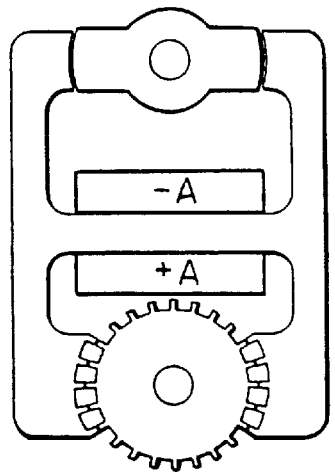
Figure 4C:
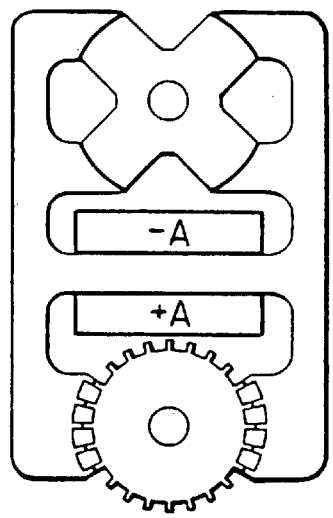
Figure 4D:
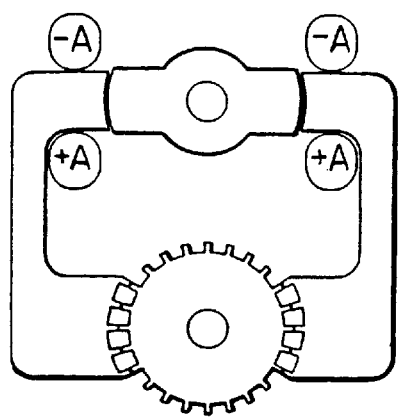
Figure 4E:
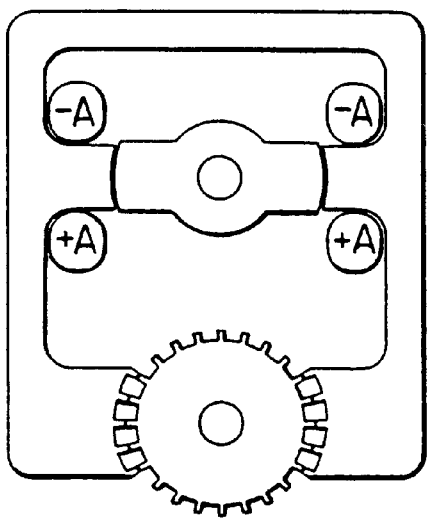
Figure 4F:
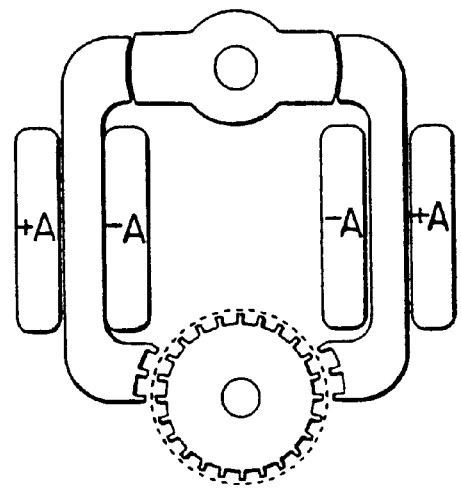
Figure 4G:
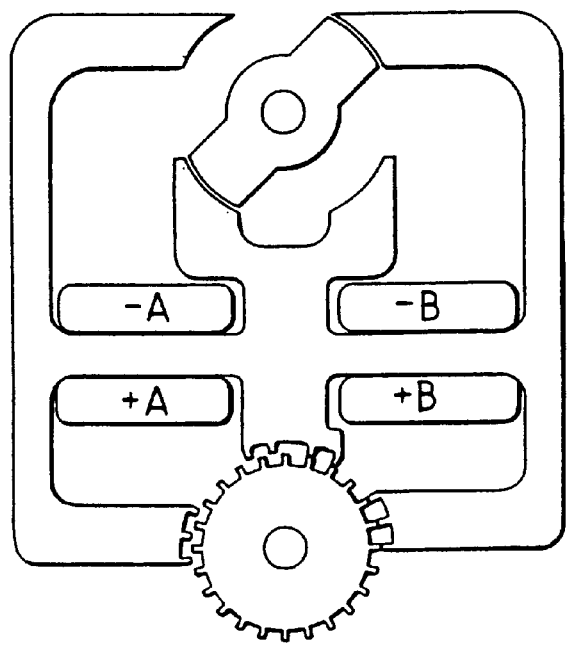

It will also be appreciated that this principle can be applied to many alternative arrangements and very many alternative variations are possible. FIGS. 4*b, c, d, e* and *f* each show, schematically, different arrangements of a single switched reluctance motor having a common winding or set of windings driving two separate rotors. In each case, the number of poles carried by each rotor is different. It will be appreciated that the number of poles on each rotor can be varied at will. FIG. 4*g* illustrates schematically a two-phase switched reluctance motor having two windings instead of one and also driving two separate rotors. One advantage of driving two separate rotors by means of one winding or set of windings is that the volume occupied by the motor will be reduced and the associated mass will therefore also be reduced.

The rotors of a motor in accordance with the invention can either rotate uni-, contra- or multi-directionally.

In the case of a switched reluctance motor, the initial direction of rotation is usually determined by the initial position of the rotor pole(s) relative to the stator pole(s) and/or the phase switching sequence(s) when a current pulse is applied to the winding(s).

Figure 5B:
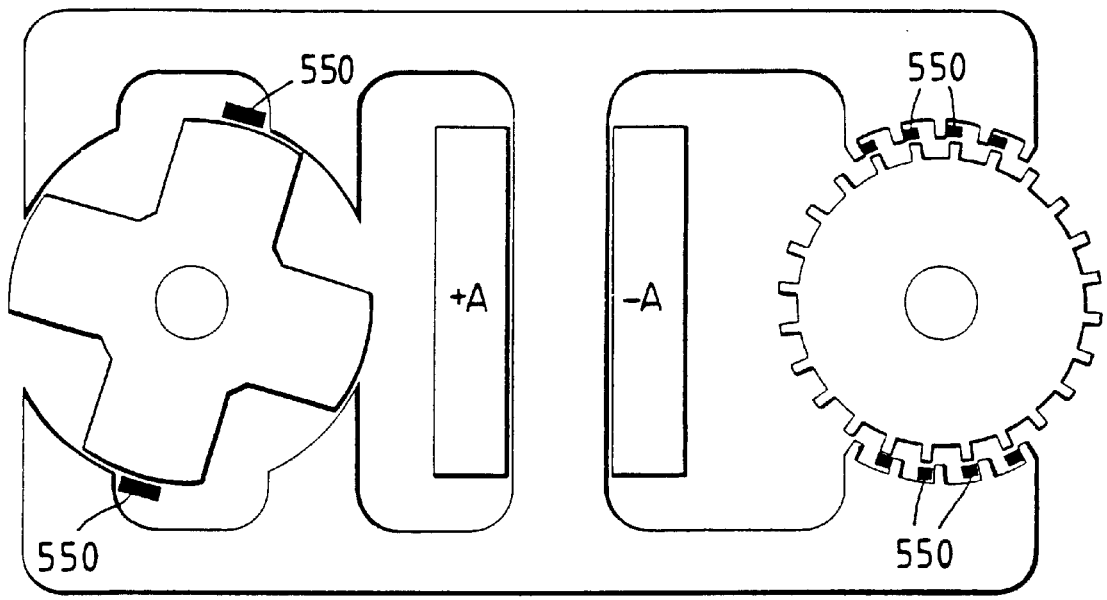
FIGS. 5a and 5b are schematic cross-sectional views of alternative motor arrangements in accordance with the invention.
Figure 5A:
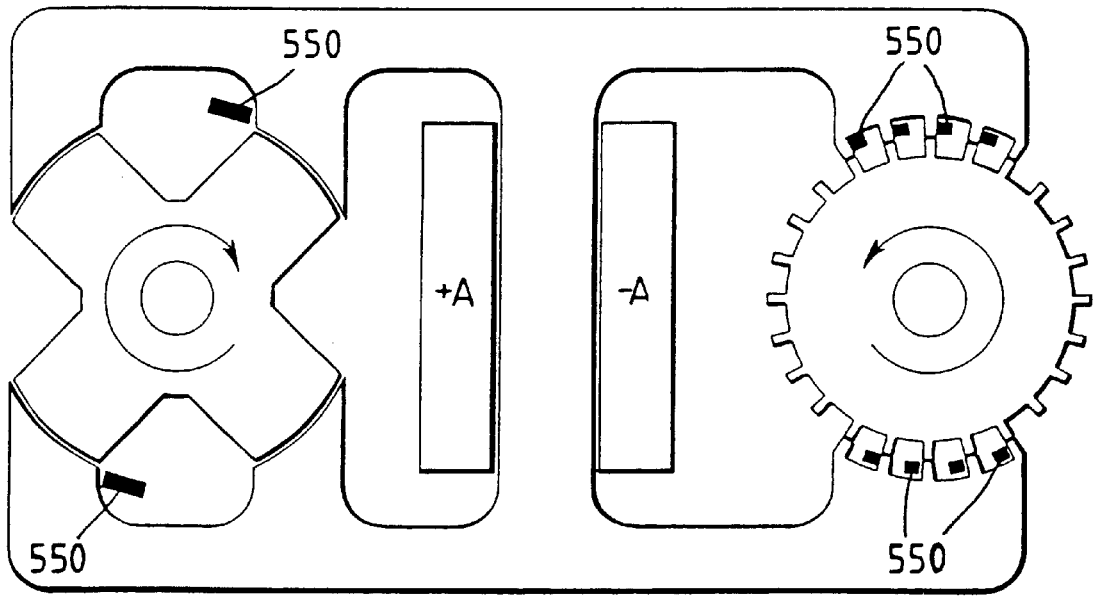

If one considers the motoFIG. 4, it is possible to obtain either uni- or contra-directional rotation by locating the rotors at suitable respective orientations relative to the stator prior to the application of a current pulse. FIGS. 5*a* and 5*b* show a motor in which magnets 550 are provided for parking the rotors when the driving current is terminated, so that the rotors will be in a suitable position for contra-directional rotation when a current is next applied. In this regard, FIG. 5*a* shows a motor with different speed outputs at an initial parking position prior to the application of a driving current. FIG. 5*b* shows the direction of rotation of the respective rotors after the winding is excited. It will be seen from the figure that the two rotors rotate in respectively opposite directions. It will be seen that the magnets are strategically positioned in order to align each of the poles of the rotors to be closer to one particular pole than an adjacent pole. Therefore, when the coil is excited, each rotor pole moves towards that closest stator pole, thereby determining the direction of rotation. Naturally, a mechanism could be provided for adjusting the position of the magnets, so as to change the direction of rotation of a particular motor.

An alternative for multi-phase switched reluctance motors having more than one rotor is to arrange the phase sequences to be such that they produce either uni- or contra-directional rotation in the rotors. It is also possible to control the direction of the rotation by providing asymmetrical air gaps between the rotor and stator poles.

The above motor arrangements allow contra-directional rotating elements to be provided without a prohibitive increase in cost or mechanical complexity. The motor arrangements can also provide significant additional advantages as follows. First, net angular momentum can be cancelled or reduced. This leads to the minimization of acceleration/retardation reaction torques on both the motor and/or the appliance or product to which it is fitted. Furthermore, net gyroscopic effects can be cancelled or reduced. This leads to a minimisation of gyroscopic forces on the motor and/or the appliance or product when subject to general movement. Such motor arrangements also enable a reduction of acoustic and mechanical vibrations through various methods including superposition cancellation.

A motor having contra-directional rotors, such as described above, can provide significant asignificant advantages when used in a vacuum cleaner for rotating motorised dual or multiple cyclones. More specifically, the motor can be used to drive the impellers inside the inner and outer bins directly. Further, if desired, the air flows through the inner and outer cyclones can be connected in series—resulting in a potential load matching between the motor's outputs and thus a simplification and reduction of the power electronics and/or mechanical complexity.

In the case of switched reluctance motors, the switching times of primary and/or additional windings can be controlled using information from position sensor(s) on the primary and/or additional rotor(s). If desired, the positional information of the rotors can be combined (e.g. via a microprocessor, combinational logic or physical construction of the sensor(s)) to give the desired operating characteristics for the motor and/or the product/appliance they are used within or in combination with. This allows for a potential simplification of the power electronics circuitry and thus a potential reduction in the overall cost, size and weight of the product/appliance.

Figure 6:
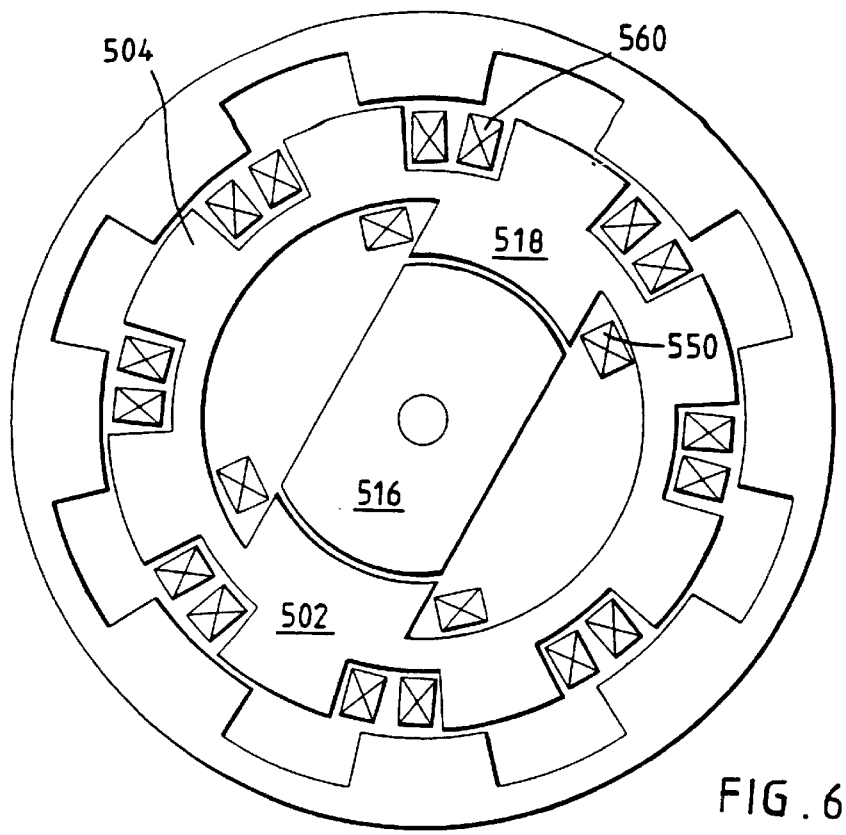
FIG. 6 is a schematic cross-sectional view of a motor in accordance with the present invention.
Figure 7:
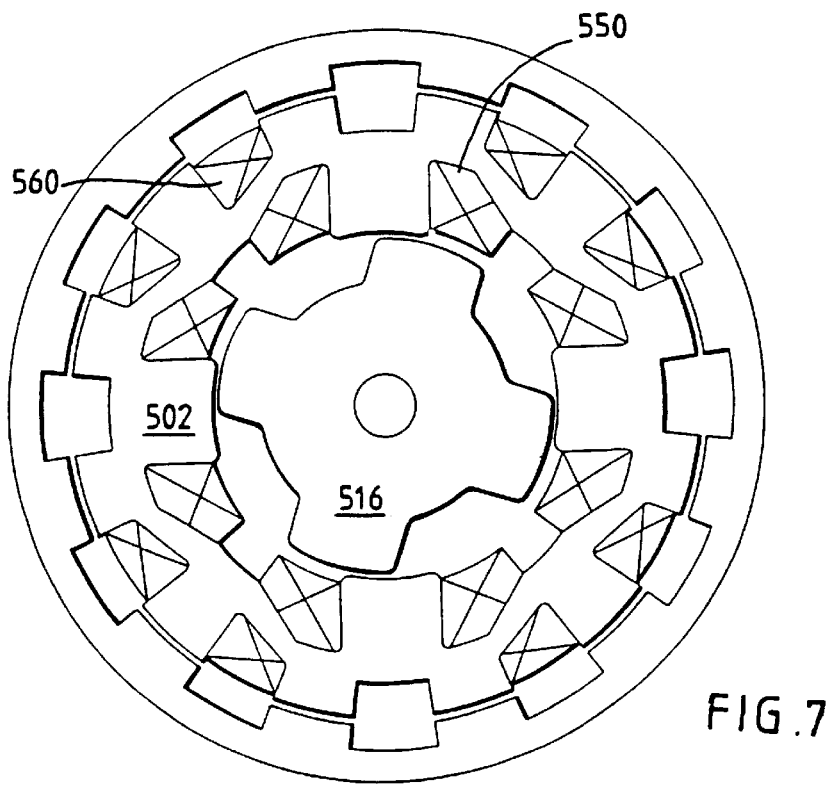
FIG. 7 is a still further cross-sectional view of a motor in accordance with the present invention.

FIGS. 6 and 7 show variations of the winding structure for a dual output single phase motor, such as shown in FIG. 4*a*, for example. In each of FIGS. 6 and 7, the stator 502 is provided with two sets of windings. In this regard, a first winding 550 is wound around the radially inwardly directed poles 518 and a second winding 560 is wound around the radially outwardly directed poles 504.

FIG. 7 shows a broadly similar arrangement to FIG. 6, however there is some radial overlap between the radially inner windings 550 and the radially outer windings 560. This arrangement enables significant reductions in size for a given number of winding turns.

In vacuum cleaner applications, it is possible to provide more than one impeller to draw the air through the cleaner. Typically, and in accordance with the embodiment shown in FIG. 8, a first impeller 570 can be arranged upstream of the bag (not shown) which separates the dirt and dust from the airflow whilst a second impeller 572 can be arranged downstream thereof. The first impeller 570 can be rotated more slowly than the second impeller 572 but can have a larger size to accommodate the passage of larger dust particles. The second impeller 572 can be made relatively smaller because it only sees finer dust particles. This facilitates an elevated operating speed which further improves the performance of the vacuum cleaner. Further, the ratio of the speeds of the rotors can be configured to compensate for the ratios of fan/rotor inertias thus allowing for reduced or net zero gyroscopic forces. A third motor output could be provided to rotate a brush bar.

Figure 8:
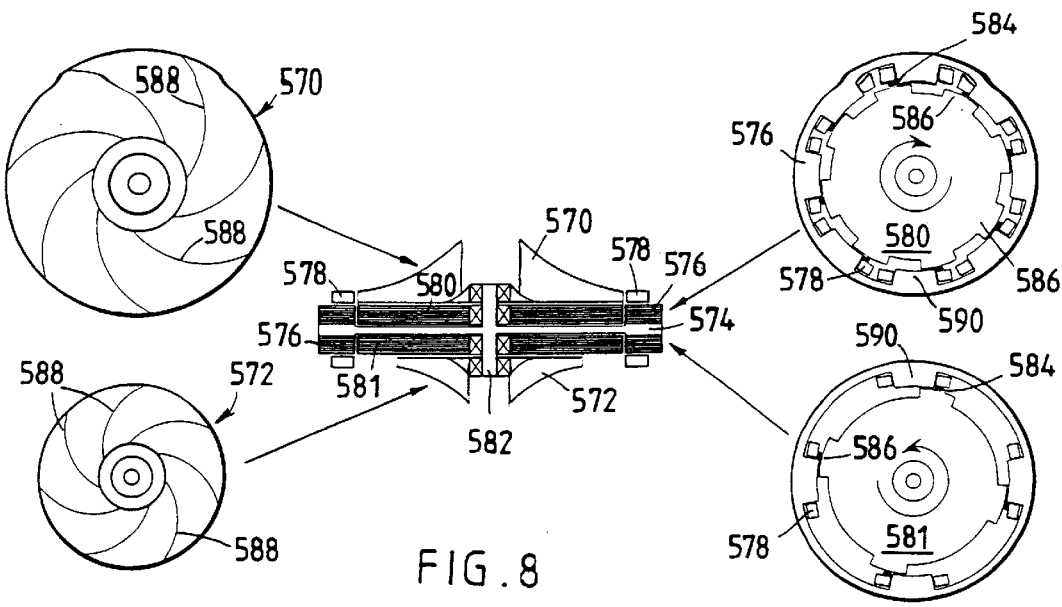
FIG. 8 is a schematic sectional view of a further motor in accordance with the invention.

Looking at FIG. 8 in more detail, the motor arrangement comprises a central mechanical support 574 supporting an axially central stator 576 provided with laminated poles 590. The poles 590 are provided with windings 578. A pair of axially aligned rotors 580, 581 are provided on respective axial sides of the stator 576. The impellers 570, 572 are provided on the axial sides of the rotors 580, 581 remote from the support 574. The impellers 570, 572 and rotors 580, 581 are mounted upon a central shaft 582 which is integrally formed with the support 574. Parking magnets 584 are provided for locating the poles 586 of each rotor 580, 581 closer to poles which are respectively on circumferentially opposite sides of the mid-point between any given adjacent pairing of stator poles 590. This has the effect of causing the rotors 580, 581 to rotate in opposite directions when the windings 578 are excited. To ensure that the impellers 570, 572 draw air from opposite sides of the motor arrangement, each impeller 570, 572 has vanes 588 which are oriented in the opposite direction to those of the other impeller. Air can thus be drawn from the dirty air inlet of the vacuum cleaner by the impeller 570, expelled from there to the dirt and dust collecting bag in which the air is cleaned, and then drawn back from the bag to the clean air outlet by the impeller 572.

Figure 9:
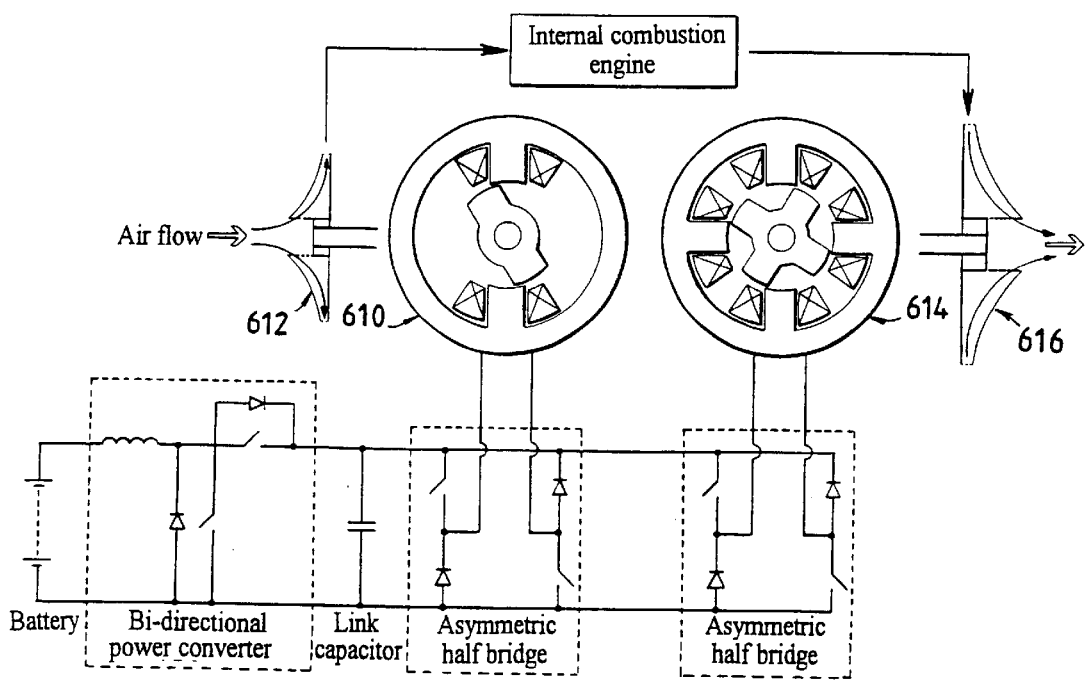
FIG. 9 shows an arrangement in which a motor and generator are coupled together.

Another application of the invention is the variation of the ratio of the speeds of a motor and a generator. An example of this type of application is the variation of the speeds of the turbine and the compressor in the turbo-charger on an internal combustion engine in an automotive vehicle as illustrated in FIG. 9. This can be achieved in practice by the use of a switched reluctance motor 610 to drive the compressor 612 and a switched reluctance generator 614 to absorb the energy of the turbine 616. The speed of the compressor 612 can be synchronised to an integer multiple of the speed of the turbine 616 and to the combination of the ratios of the motor/generator poles so that the input power per "stroke" of the generator 614 can be transferred directly to the output power per "stroke" of the motor 610. Such a variable ratio turbo-charger has many advantages over a standard unity ratio turbo-charger, including improved engine power and efficiency, reduced "turbo" lag, high reliability combined with compact size of components and robust construction. The arrangement is not expensive to manufacture and can be linked in to the engine management system. It may also provide an opportunity for the vehicle alternator to be removed for being redundant.

Many further modifications and variations will suggest themselves to those versed in the art upon making reference to the foregoing description which is given by way of example only and is not intended to limit the scope of the invention, that being determined by the appended claims.

What is claimed:

1. A switched reluctance motor comprising two or more rotors which are rotated by means of a common power supply, each rotor having a plurality of poles and being, associated with a common stator, the stator having a first plurality of poles for driving a first of the rotors and a second plurality of poles for driving a second of the rotors, wherein the arrangement of rotor poles and stator poles is different for each rotor so that the rotors rotate at different speeds when the common power supply is applied.

2. A motor as claimed in claim 1, wherein the number of stator poles is the same for each rotor, but the number of rotor poles is different.

3. A motor as claimed in claim 1, wherein means are provided for causing at least one of the rotors to rotate in a direction opposite to the direction of rotation of the remaining rotor or rotors.

4. A motor as claimed in claim 3, wherein the said means comprise magnets which are located in such positions as to prime the rotors, when stationary, for rotation in mutually opposite directions by locating each rotor pole closer to a predetermined one of two adjacent stator poles.

5. A motor as claimed in claim 1, wherein the motor is housed in a vacuum cleaner.

6. A motor as claimed in claim 5, wherein one of the rotors is adapted to drive the impeller of the vacuum cleaner.

7. A motor as claimed in claim 6, wherein a second of the rotors is adapted to drive a second impeller of the vacuum cleaner.

8. A motor as claimed in claim 6, wherein one of the rotors is adapted to drive a brush bar of the vacuum cleaner.

9. A motor comprising two or more rotors rotated by means of a common power supply, each rotor having a plurality of poles and being associated with a common stator, the stator having a first plurality of poles for driving a first of the rotors and a second plurality of poles for driving a second of the rotors, wherein the arrangement of rotor poles and stator poles is different for each rotor so that the rotors rotate at different speeds when the common power supply is applied and one of the rotors forms part of a switched reluctance generator.

10. A motor as claimed in claim 9, one of the rotors is used to drive a compressor of a turbo charger and the switched reluctance generator is adapted to absorb energy from the turbine.

11. A vacuum cleaner comprising a switched reluctance motor having two or more rotors rotated by means of a common power supply, each rotor having a plurality of poles and being associated with a common stator, the stator having a first plurality of poles for driving a first of the rotors and a second plurality of poles for driving a second of the rotors, wherein the arrangement of rotor poles and stator poles is different for each rotor so that the rotors rotate at different speeds when the common power supply is applied.

12. The vacuum cleaner of claim 11, wherein one of the rotors is adapted to drive an impeller of the vacuum cleaner.

13. The vacuum cleaner of claim 12, wherein a second of the rotors is adapted to drive a second impeller of the vacuum cleaner.

14. The vacuum cleaner of claim 11, wherein one of the rotors is adapted to drive a brush bar of the vacuum cleaner.

15. The vacuum cleaner of claim 11, wherein a first rotor and a second rotor each operate as a switched reluctance motor.

16. The vacuum cleaner of claim 11, wherein a first rotor and a second rotor each operate as a stepper motor.

* * * * *